United States Patent

Paucha

[15] 3,693,328

[45] Sept. 26, 1972

[54] FILTER APPARATUS WITH REMOVABLE FILTER ELEMENTS

[72] Inventor: Gene Paucha, Montreal, Quebec, Canada

[73] Assignee: Farr Company, El Segundo, Calif.

[22] Filed: May 4, 1970

[21] Appl. No.: 34,132

[52] U.S. Cl. ................. 55/436, 55/440, 55/443, 55/502, 55/504, 55/DIG. 37
[51] Int. Cl. ............................................. B01d 45/06
[58] Field of Search ......... 55/DIG. 37, 436, 440, 481, 55/502, 442–446, 504, 506, 496

[56] References Cited

UNITED STATES PATENTS

| | | | |
|---|---|---|---|
| 3,369,349 | 2/1968 | Farr | 55/442 |
| 3,411,273 | 11/1968 | Duncan et al. | 55/481 X |
| 3,190,058 | 6/1965 | Farr et al. | 55/DIG. 37 |
| 2,675,094 | 4/1954 | Young | 55/481 X |
| 3,155,474 | 11/1964 | Sexton | 55/442 X |
| 2,357,734 | 9/1944 | Haber | 55/DIG. 37 |
| 3,243,942 | 4/1966 | Burke | 55/387 |
| 2,130,107 | 9/1938 | Somers | 55/502 |
| 3,355,864 | 12/1967 | Sobeck | 55/443 |

FOREIGN PATENTS OR APPLICATIONS

| | | | |
|---|---|---|---|
| 929,443 | 6/1963 | Great Britain | 55/DIG. 37 |
| 489,150 | 5/1927 | Germany | 55/436 |
| 607,963 | 6/1931 | Germany | 55/DIG. 37 |

Primary Examiner—Frank W. Lutter
Assistant Examiner—Vincent Gifford
Attorney—Lyon & Lyon

[57] ABSTRACT

An inertial type dust separating apparatus having a filtering media which includes a plurality of individually removable filter elements which are rigidly secured to the apparatus in a spaced and converging relationship.

8 Claims, 8 Drawing Figures

PATENTED SEP 26 1972 3,693,328

INVENTOR
GENE PAUCHA

BY Lyon & Lyon
ATTORNEYS

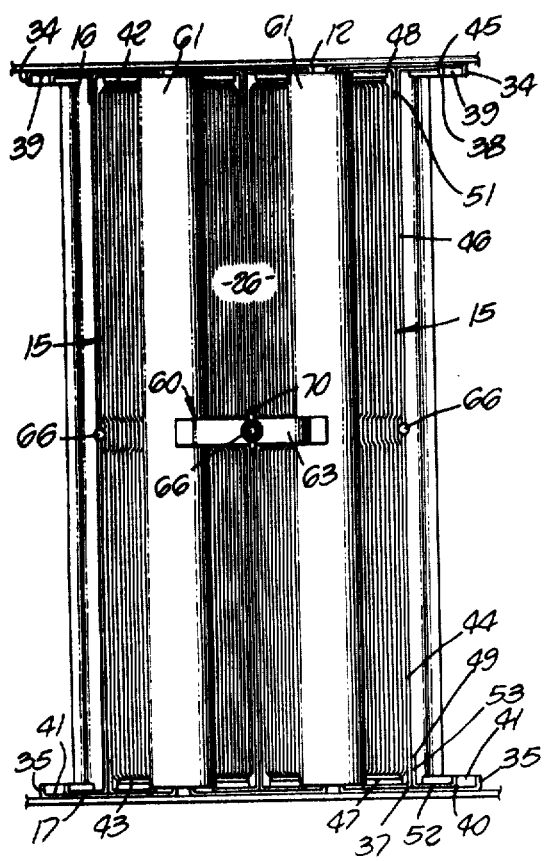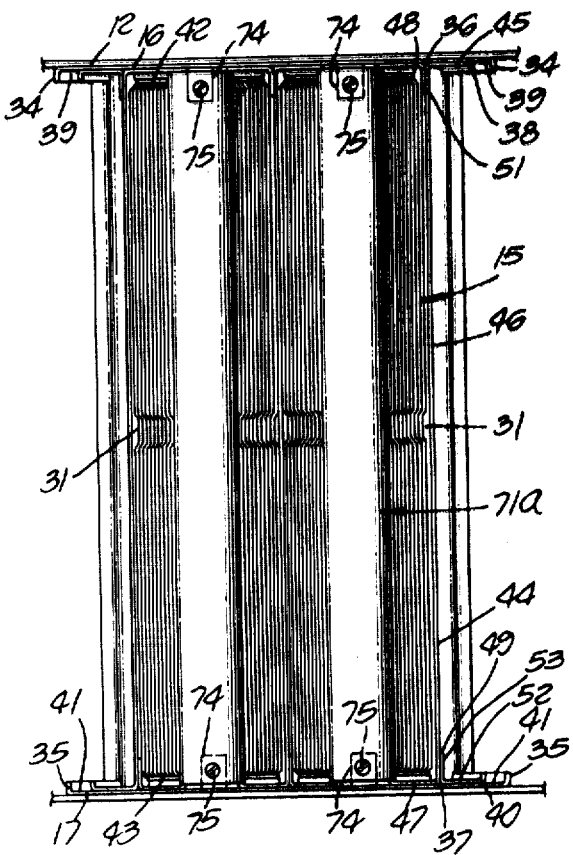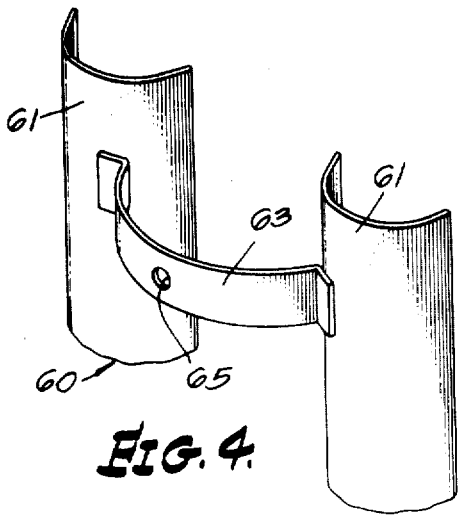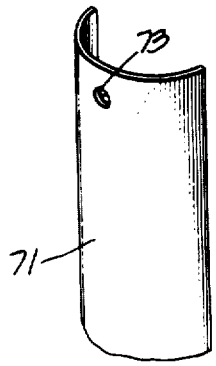

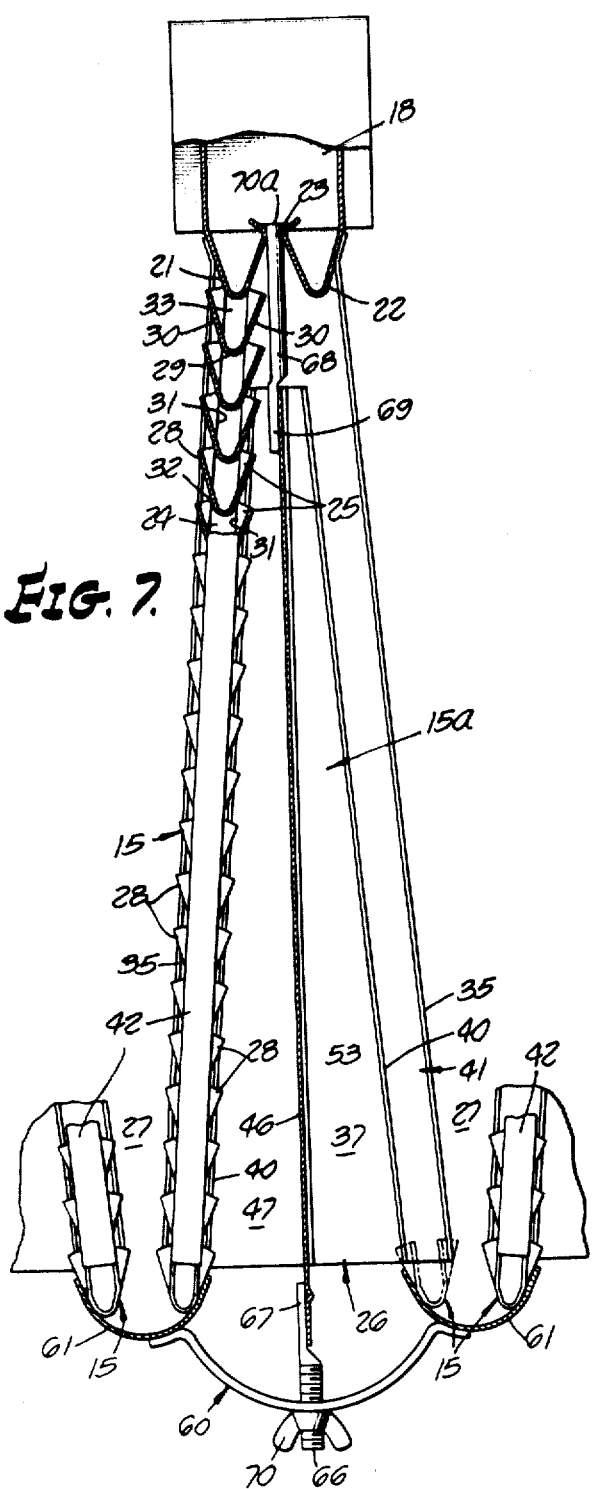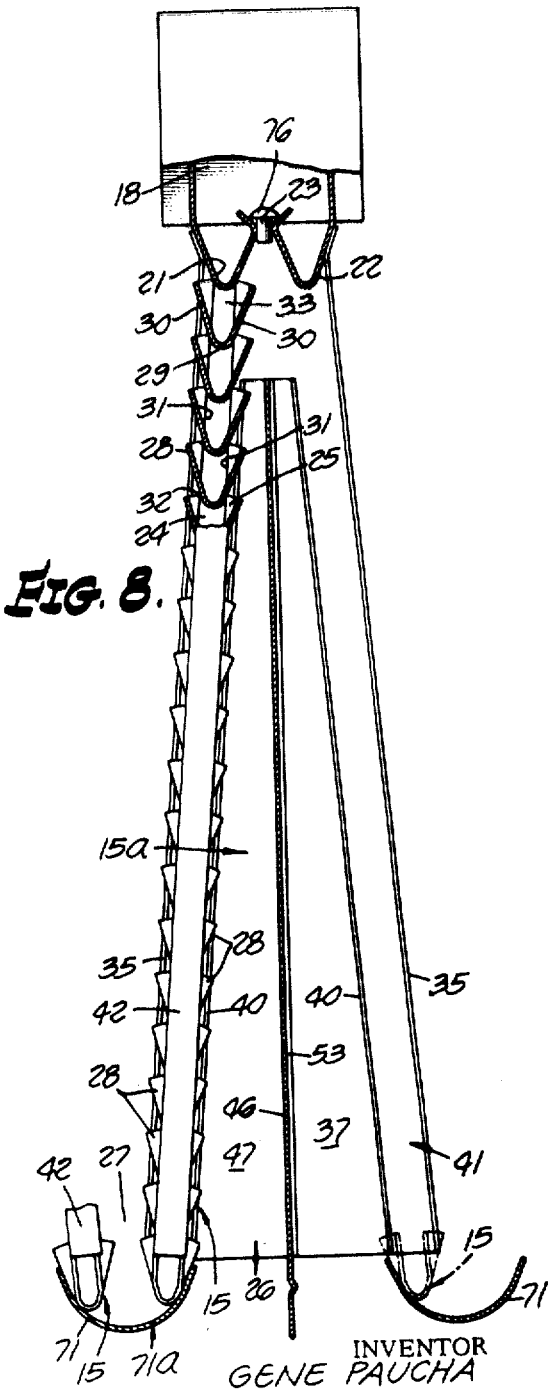

FILTER APPARATUS WITH REMOVABLE FILTER ELEMENTS

This invention relates to a dust separating apparatus which removes the dust or other foreign particles from air or other gaseous fluids at relatively high rates by means of inertial separation action and, in particular, is directed to an improved and unique construction of such an apparatus which is more easily maintained without loss of effectiveness.

There are several filtering devices wherein fluid having particles entrained therein is caused to change direction abruptly thus separating the particles as a result of their inertia. Generally, it is desirable that a device of this type have a plurality of parallel units, each with an inlet and an outlet, in a single housing in order to distribute the large volume of gaseous fluid flow over the filter media comprised of several filter elements.

Frequently, it is necessary to remove the filter media for inspection and maintenance or replacement. In the past the filter media has normally comprised a single body and removal of this body was difficult and time consuming. In addition, the material which tends to clog the filter elements is not easily removed and must either be scraped off or dissolved and the latter means has been generally employed because of the inaccessability to portions of the filter media. When the material is removed by dissolving it, the entire filter body is immersed in a solution in a tank and soaked over-night. Moreover, when a single filter element was damaged or was required to be replaced the entire filter media had to be removed.

Therefore, it is a primary object of this invention to provide a filter apparatus which can be easily and efficiently maintained without requiring removal of the entire filter media.

Accordingly, by this invention there is provided an inertial type filtering apparatus which includes a plurality of parallel units each having a pair of filter elements which are individually removable and replaceable and which are rigidly supported within the housing of the apparatus in a vertically spaced and converging relationship. Each pair of filter elements are held in place by converging upper and lower horizontal rails of sufficient strength and rigidity to properly support the elements in the housing. Each filter element is secured to the housing by a locking mechanism which avoids interference with the filtering operation of the apparatus and which is easily accessible to a workman.

Other and more detailed objects and advantages of this invention will appear from the following description and accompanying drawings.

In the drawings:

FIG. 2 is a fragmentary front view of the inlet opening of one of the parallel units and the preferred embodiment of the locking mechanism.

FIG. 3 is a fragmentary front view similar to FIG. 2 with a modified form of the locking mechanism.

FIG. 4 is a fragmentary view of the preferred embodiment of the locking mechanism.

FIG. 5 is a fragmentary view of the modified form of the locking mechanism.

FIG. 7 is a top fragmentary view illustrating the preferred form of the locking mechanism.

FIG. 8 is a top fragmentary view illustrating a modified form of the locking mechanism.

Figure 1:
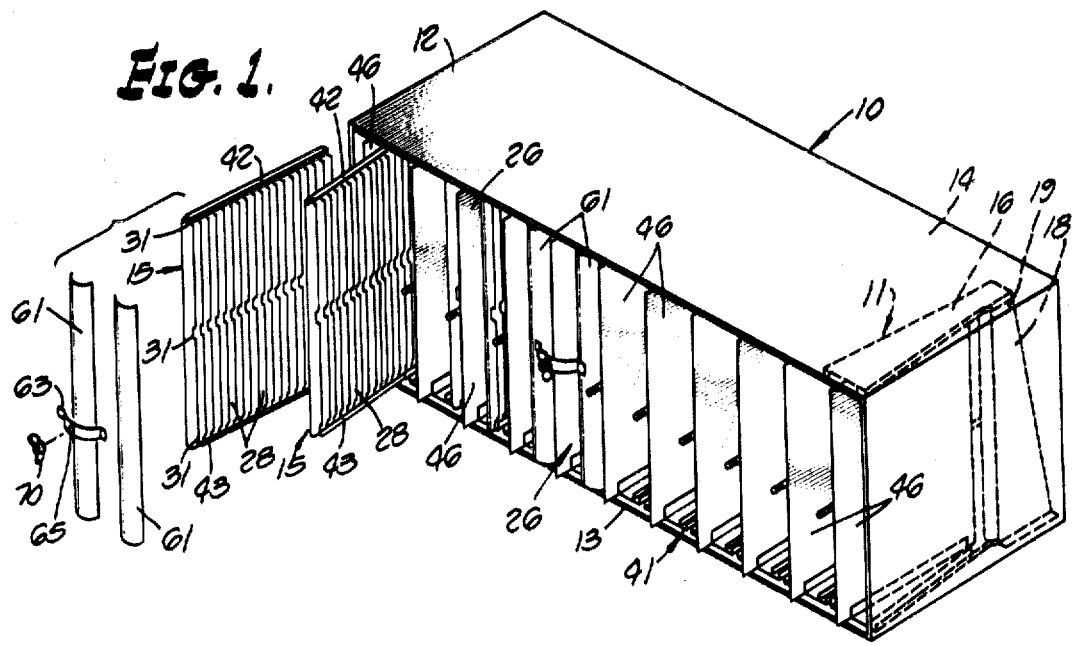
FIG. 1 is an exploded perspective view of the filter apparatus of this invention illustrating the removal of a pair of filter elements and the preferred form of the locking mechanism securing these elements within the housing.

Referring now to the drawings, the filter apparatus, generally designated 10, is comprised of a plurality of generally V-shaped inertial separating units, each generally designated 11, positioned in side-by-side relation within a housing 12. When installed, the filter apparatus 10 is positioned in the air or gaseous fluid handling system with the face 13 of the housing forming the inlet to the apparatus and the opposite face 14 forming the clean air outlet of the apparatus 10. In this manner the inlet and outlet directions of gaseous fluid flow are in substantially the same direction through the housing 12 as will appear more fully from the detailed description of the units 11 set forth below. Since each unit is identical the description hereafter will be of one of said units.

Each unit 11 includes a pair of filter elements, generally designated 15 supported within the housing 12 in such a manner that they converge toward each other in the direction toward the outlet thereby forming the referred to V-shape of the unit and thereby defining a converging flow passage 15a. As seen best in FIG. 6, the lateral ends of the unit 11 and also the ends of the two elements 15 are enclosed by top and bottom end plates 16 and 17, respectively, to both confine the inlet gas flow between the elements 15 and support the elements 15. At the end of the unit 11 where the elements converge is a "bleed off" duct 18, often referred to as a "dust bin," which as shown in FIG. 7, is adapted to receive the vertical ends of the elements 15. One end 19 of the duct 18 is connected to and enclosed by the top plate 16 and the other end 20 is open and provided with appropriate flanging for connecting to the housing 12 and/or appropriate manifolding. As shown in the drawings, the cross-sectional area of the duct 18 generally increases from the closed end 19 to the open end 20, however, ducts having a uniform cross-sectional area may also be used.

Referring in further detail to FIG. 7, the converging ends of the filter elements 15 are slightly spaced from each other and vertically extending V-shaped flange members 21 and 22 on the front face of the dust bin 18 are adapted to abut and receive the vertical ends of the filter elements 15. As will be made more clear below, the V-shape of these members assists in providing the proper fit between the dust bin 18 and the filter panels 15. The V-shaped flange members 21 and 22 extend the entire vertical length of the dust bin 18 and a bleed slot 23 is provided on the dust bin or duct 18 between the members 21 and 22 for allowing the separated dust and "bleed-off" air to pass from the converging flow passage 15a into the duct 18. The details of and the reasons for the exact construction and configuration of the elements 15 are hereinafter set forth but for an understanding at this point of the operation of unit 11, it is only necessary to note that filter elements 15 are provided with a multiplicity of lateral passageways 24 therethrough with the inner or inlet ends 25 of such passageways generally facing in the downstream direction of inlet air flow. As is conventional with this type device, the dust laden incoming air flows in through the inlet opening 26 of the unit 11 through the flow passage 15a toward the bleed slot 23. Most of this air passes out through passageways 24 as clean air due to the inertia of the dust particles which prevents such particles from turning in the upstream direction into the inlets 25 of the passageways 24. Therefore, the dust particles continue in the direction toward the bleed slot 23 and are carried therethrough into duct 18 by a small proportion of the inlet air. When the units 11 are positioned side-by-side as in apparatus 10, the filter elements 15 of adjacent filter units 11 diverging from each other in the direction toward the outlet end of the housing define clean air passages 27 between adjacent units through which the clean air flows longitudinally outwardly.

The filter elements 15 include a multiplicity of vanes or blades 28 which are assembled to form the passageway 24 between each pair of adjacent blades. The blades are elongated and have a substantially V-shaped cross-section comprised of a central curved portion 29 and a pair of straight skirt portions 30 extending from the curved portion. The skirt portions extend tangentially from the curved portion 29 whereby the blade 28 is of a smooth configuration to minimize the turbulence-generating configuration of the passageways 24. At the center and at each end of each blade 28 the skirt portions 30 are provided with means for supporting and spacing each blade from the next adjacent blade and these means may include an embossed spacer tab 31 formed integrally from the material of a portion of each skirt portion 30 by deforming the material readily. Opposed spacer tabs 31 on two skirt portions 30 extend substantially parallel to each other rather than diverging as do the skirt portions. The exposed end 32 of each spacer tab engages the outside surface of the next adjacent blade 28 to establish a predetermined center-to-center spacing or "pitch" between adjacent blades to form the passageways 24 between the blades and along the blades between the spacer tabs. It should be noted that the similarity in shape between the V-shaped flange members 21 and 22 on the duct 18 and the V-shaped blades 28 along with the spacer tabs 31 on the end blades form a passageway 33 between the end blades of the filter elements 15 and the members 21 and 22 which functions in the same fashion as the passageway 24. This arrangement makes certain that the incoming air will travel either through a curved passageway or the bleed slot 23. While the blades 28 are commonly formed of metal, plastic has also been found to be a suitable material.

Figure 6:
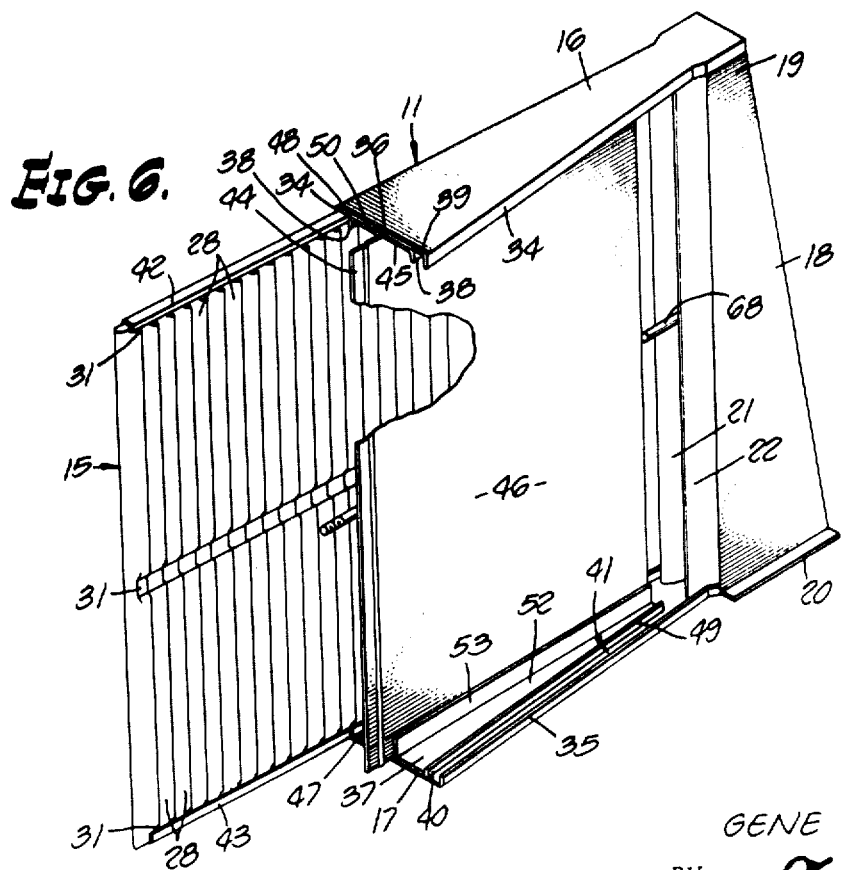
FIG. 6 is a perspective view of one of the parallel units illustrating the guide and support member for the filter elements.

As seen in FIG. 6, the top and bottom end plates 16 and 17 each include downwardly and upwardly extending side flanges 34 and 35, respectively. Secured generally by welding, to the inner surfaces of the top and bottom end plates 16 and 17 are top and bottom guide members 36 and 37, respectively. The guide member 36 includes downwardly extending side flanges 38 which are parallel to the downwardly extending flanges of the top plate 16. The side flanges 38 and the side flanges 34 form a pair of upper rails 39 which converge as they extend rearwardly from the inlet 26 of unit 11. The guide member 37 includes upwardly extending side flanges 40 which are parallel to the upwardly extending flanges of the bottom plate 17. The side flanges 40 and the side flanges 35 form a pair of bottom rails 41 which converge as they extend rearwardly from the inlet 26 of a unit. It is these rails 39 and 41 which guide and support each pair of filter elements 15 within each unit 11 of the filter apparatus 10. To facilitate movement of the filter elements within the rails and to insure a proper fit between the filter elements 15 and the rails 39 and 41, each filter element 15 includes a top slide member 42 which covers the top of the blades 28 and a bottom slide member 43 which covers the bottom of the blades 28.

The guide members 36 and 37 are formed by three components. One component 44 comprises one of the downwardly extending flanges 38, a first tapered flat portion 45 which is secured to the top plate 16, a central panel 46 which is positioned between the filter elements 15 and extends perpendicularly from the top plate 16 to the bottom plate 17, a second tapered flat portion 47 which is secured to the bottom plate 17 and one of the upwardly extending flanges 40. Each flat portion 45 and 47 is perpendicular to the central panel 46, however, the flat portions 45 and 47 extend outwardly from the panel 46 in opposite directions.

The component 44 with its integral central panel 46 provides support for the unit 11 and improves the overall operation of the filter apparatus 10. The other two components 48 and 49 are identical in shape and are positioned on opposite sides of the central panel 46. Component 48 comprises the other downwardly extending flange 38, a tapered flat portion 50 which is secured to the top plate 16, and a second downwardly extending flange 51 which is flush with and connected to the panel 46. Component 49 comprises the other upwardly extending flange 40, a tapered flat portion 52 which is secured to the bottom plate 17 and a second upwardly extending flange 53 which is flush with and connected to the panel 46. The flanges 51 and 53 which are connected to the panel 46 are generally wider than the flanges 38 and 40 and offer further support to the panel 46.

The preferred embodiment of the locking mechanism generally designated 60, is seen best in FIGS. 1, 2, 4 and 7. Each locking mechanism 60 of this embodiment is adapted to secure two filter elements 15 of one unit 11 and one other adjacent filter element 15 of each of the two adjacent units. As shown in FIG. 7, the adjacent filter elements 15 of the adjacent units diverge from each other in the direction toward the outlet and generally define the space 27 between the adjacent units. The lock mechanism 60 includes a pair of elongated gas flow directing cover members 61 each of which extends vertically between the top and the bottom of the housing 12 and each is adapted to receive the two ends of the filter elements 15 at the inlet end between each filter unit which define a clean air passage 27. These cover members prevent the direct flow of gas into the clean air passages 27 at the outlet end of the housing and the concave and generally U-shape in cross-section of the cover members acts to direct the gas flow into the adjacent inlets 26 and converging flow passages 15a. The cover members are connected by a yoke 63 which is also generally U-shaped in cross-section but relatively narrow in vertical width so as not to interfere with the gas flow into the inlet 26. The yoke 63 is centrally positioned between the top and bottom of the housing 12. Preferably, the yoke 63 is made of spring steel to exert a constant pressure on the cover members 61, and through these, hold the filter elements 15 in place. The yoke 63 also includes a central opening 65 which is adapted to receive one end of an externally threaded member 66. The other end 67 of the threaded member 66 is secured to the central panel 46. A connecting rod member 68, in general parallel alignment with the threaded member 66, is secured at one end 69 to the rearward portion of the central panel with the other end 70a of the rod member 68 positioned in the bleed slot 23 and secured to the members 21 and 22. The connecting rod member 68 prevents a closing or partial closing of the bleed slot 23 when the end filter elements 15 are pushed up against the members 21 and 22 and also resists horizontal forces acting on the central panel 46 which occur when the yoke 63 is secured to the threaded member 66 by a wing nut 70. Thus, when it is necessary to inspect and maintain the filter media, a workman need only loosen the wing-nut 70 on each lock mechanism, turn the yoke 63 approximately 80° and remove the cover plates 61, and slide out on the rails each filter element 15. Thus, those elements 15 which are damaged or require extensive cleaning can then be easily and quickly replaced.

The modified form of the locking mechanism generally designated 71a, is best seen in FIGS. 3, 5 and 8. This embodiment includes elongated gas flow directing cover members 71 which are identical to the cover members 61 except the cover members 71 are connected directly to the housing 12. At each end of the cover member 71 is a central opening 73. The housing 12 of this embodiment is provided with mating flanges 74 which also include an opening (not shown). Screws 75 extending through these openings in the cover members 71 and in the flanges are received by a nut (not shown) to secure the cover members 71 to the housing 12. Each cover member 71 secures only a pair of filter elements 15 of adjacent units and in this embodiment of the lock mechanism there is no yoke connecting one cover member with another. Since there are no horizontal forces applied to the central panel 46 there is no need for the connecting rod member 68, however, a spacer member 76 is positioned in the bleed slot between the members 21 and 22 to prevent closing of the slot 23. With this embodiment removal of the filter media is accomplished by removing the screws 75, thus disconnecting each cover member 71 from the housing 12, and then slidably removing the filter elements 15 from the rails.

This invention provides a filter apparatus having improved performance features along with vastly improved maintenance features. The filter elements 15 are individually removable for cleaning and replacement purposes, but they are secured within the apparatus in a manner which does not detract and generally assists in the overall functioning of the apparatus.

I claim:

1. A dust separating apparatus, comprising: a housing having an inlet and an outlet end; a plurality of generally V-shaped filter units positioned in a side-by-side relation in said housing, each with an opening at the inlet end of said housing; each said filter unit having longitudinal end plates which cover the top and bottom of said filter unit and a pair of individually removable filter elements extending between said end plates and spaced from and converging toward each other in the direction of said outlet end of said housing, each said filter unit also having a converging flow passage defined by said pair of filter elements and a duct at the converging end of said flow passage, said duct having a slot opening to provide communication between said duct and said flow passage whereby dust particles entrained in air entering said filter unit opening pass through said flow passage and said slot opening into said duct; a plurality of clean air passages between said filter units defined by said filter elements of adjacent filter units which diverge from each other in the direction of said outlet end of said housing; said filter elements each including a multiplicity of generally parallel and spaced blades and curved in lateral cross section to define lateral curved passages therebetween which pass the air from said flow passages in said filter units into said clean air passages while causing the dust particles to separate therefrom; means to secure said pairs of removable filter elements within said filter units with said converging ends pushed against said ducts; and each said duct including flange means on each side of said slot opening, each said flange means extending longitudinally between said end plates and curved in lateral cross-section, said curved flange means adapted to receive the converging ends of said filter elements and cooperate with said curved blades at the ends thereof to form additional lateral curved passages therebetween thereby providing a gasket free connection between said filter elements and said ducts.

2. The apparatus of claim 1, wherein each said filter unit is provided with guide members, said guide members secured to said end plates and cooperating with said end plates to form a pair of upper rails and a pair of lower rails, each said filter element slidably mounted on and between an upper rail and a lower rail.

3. The apparatus of claim 1, wherein each said filter unit includes a central panel, said central panel extending vertically between said end plates and extending longitudinally the length of said converging flow passage.

4. The apparatus of claim 1, wherein spacer means are provided in each said duct slot to prevent the closing of said duct slot.

5. The apparatus of claim 1, wherein each said flange means is substantially V-shaped in cross-section, the apex of said V adapted to extend into the space between the longitudinal edges of said cooperating blade.

6. The apparatus of claim 5, wherein said V-shaped flange means is adapted to be wedged within said cooperating blade with at least a portion of each edge engaging the sides of said V-shaped flange means, said engagement positioning said element with respect to said duct and said wedging and said flange means cooperating with said securing means to rigidly mount said element within said filter unit.

7. The apparatus of claim 1 wherein said securing means comprises a plurality of lock mechanisms to secure each said filter element within said filter units, each said lock mechanism including at least one elongated cover member which is concave in cross section, each said cover member adapted to receive the ends of said filter elements which define a clean air passage at the inlet end of said housing, said cover members preventing air flow into said clean air passages at said housing inlet and directing air flow into said converging flow passages through said filter unit openings, and each said lock mechanism having means to releasably secure and operably connect said cover members to said housing.

8. The apparatus of claim 7, wherein each said lock mechanism includes a pair of cover members and a yoke securing said cover members.

* * * * *